July 21, 1970  H. B. VAN DORN ET AL  3,521,342
METHOD OF MAKING A SELF-LOCKING RING
Filed July 1, 1968  2 Sheets-Sheet 2
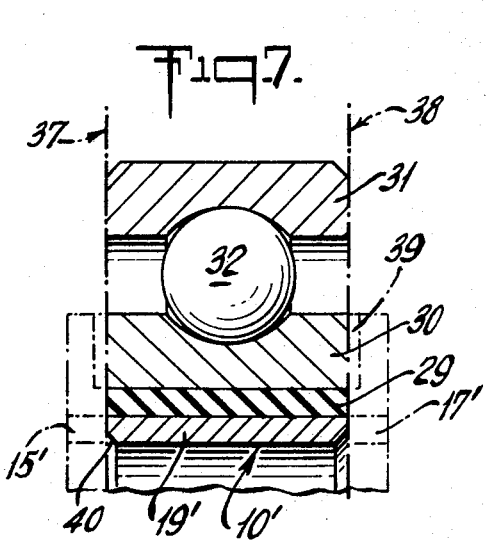
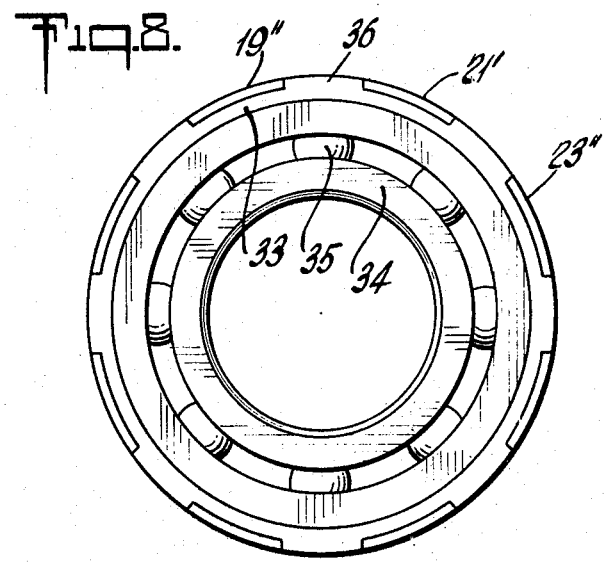
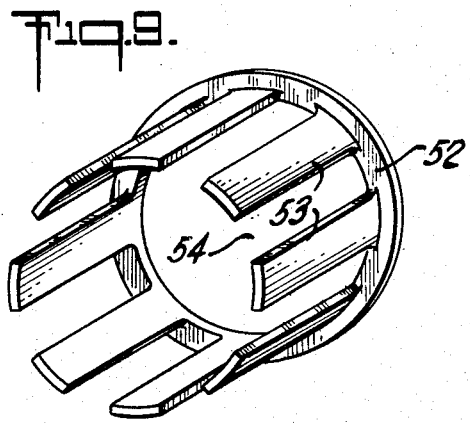
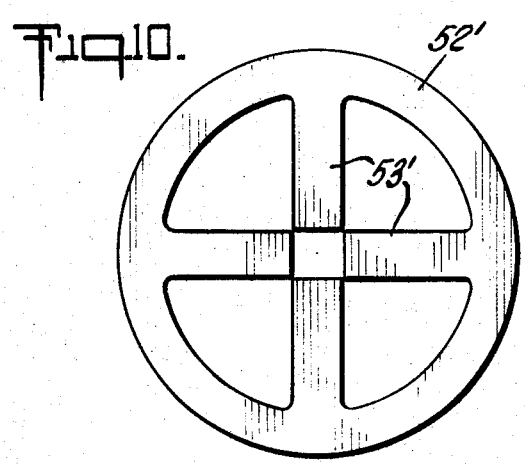
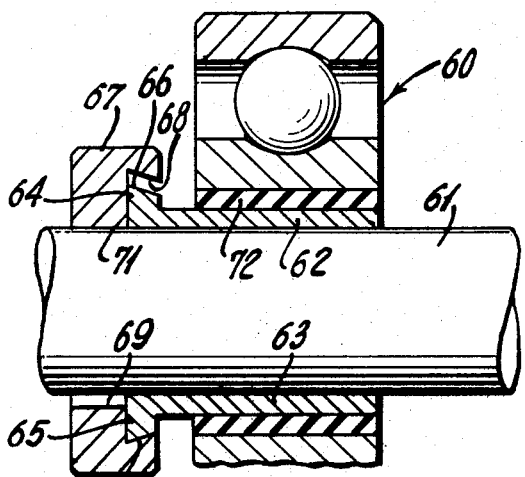
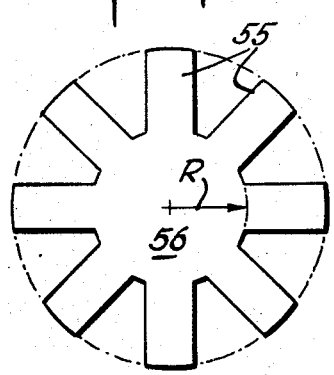
INVENTORS
HORACE B. VAN DORN
RALPH S. HOWE, Jr.
BY
Hopgood & Calimafde
ATTORNEYS United States Patent Office 3,521,342
Patented July 21, 1970

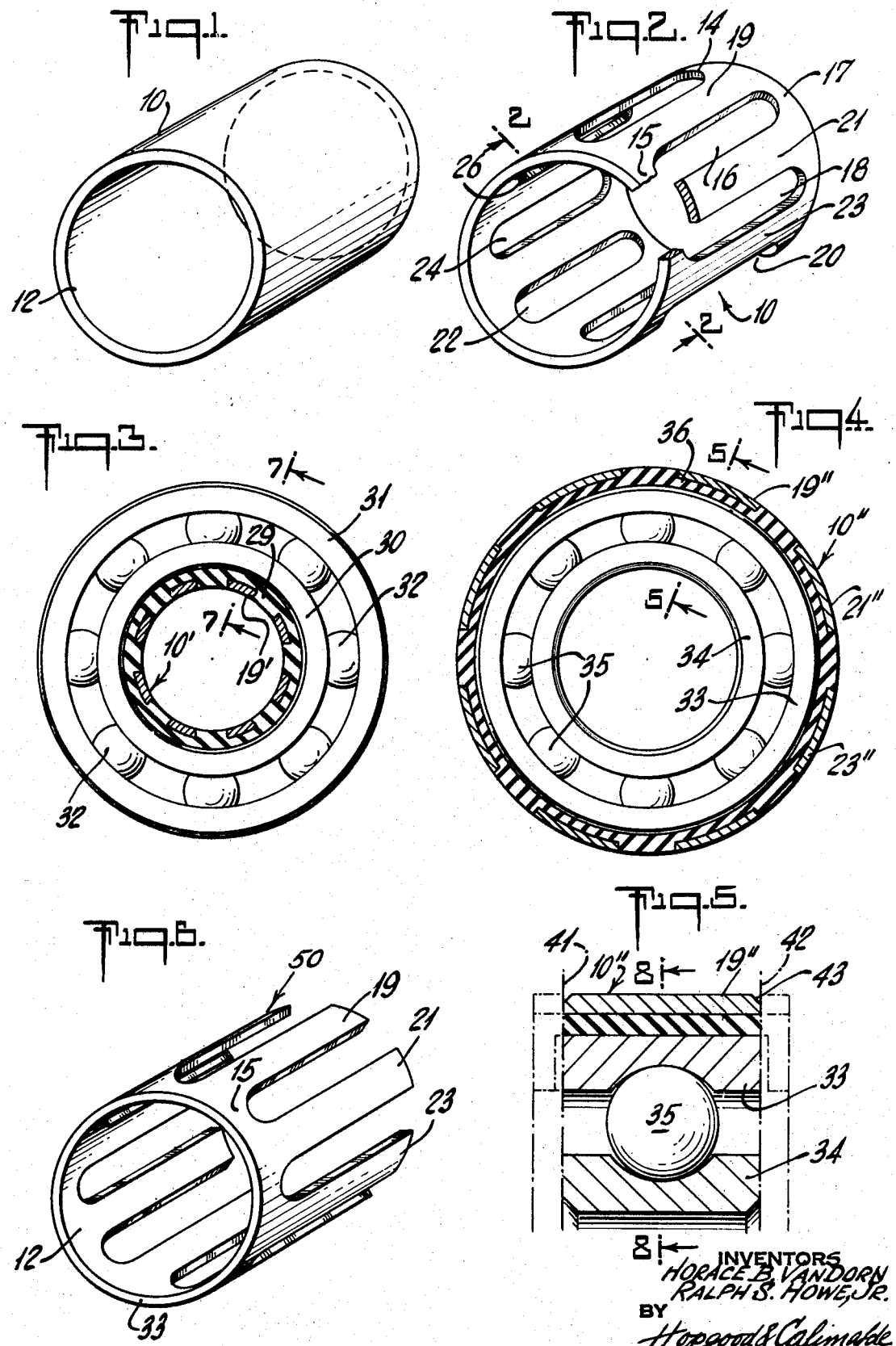

1

3,521,342
METHOD OF MAKING A SELF-LOCKING RING
Horace B. Van Dorn, Kensington, and Ralph S. Howe, Jr., New Britain, Conn., assignors to Textron, Inc., Providence, R.I., a corporation of Delaware
Filed July 1, 1968, Ser. No. 741,456
Int. Cl. B23p 11/00
U.S. Cl. 29—148.4
9 Claims

ABSTRACT OF THE DISCLOSURE

A method of making a resilient self-locking structure involves the use of a plurality of resiliently loaded clamp feet angularly distributed in concentric relationship with respect to a ring member, such as the inner or outer race ring of an antifriction bearing. The clamp feet are embedded in an elastomeric material, isolated from one another, and capable of providing biting contact either upon a shaft or within a bore to which the structure is mounted.

---

The method of this invention includes forming a cylindrical annular structure with a plurality of angularly distributed axially extending slots. This slotted structure is held in radially spaced relation with the ring to be mounted, while elastomeric material is cause to fill the slots and the annular space between the ring and the cylinder, being cured to bonded relation with the rigid parts. The interconnected segments are separated from one another by removal of material from an axial end of the cylinder. The final external or internal clamping diameter is thus essentially determined by the cylinder diameter.

In the copending patent application of R. S. Howe, Jr., Ser. No. 681,627, filed Nov. 9, 1967 and Ser. No. 738,571, filed June 20, 1968, both assigned to the same assignee, inventions are described wherein a self-locking ring structure is provided by placing a plurality of angular clamping feet within an elastomeric material in concentric relationship with inner or outer race rings of an antifriction bearing.

In the invention described in these copending applications, fabrication of the self-locking bearing contemplates the production of these embedded clamping feet by radially outward or inward removal of material from a grooved ring formed by interconnected segments which, upon removal of material, become independent clamping feet. Radial removal of material from the grooved cylinder not only frees the individual segments from one another for proper isolation within the elastomeric material, but also provides a final mounting surface of diameter which is in interference with the shaft or bore diameter to which the self-locking structure is to be mounted.

An object of the invention is to provide a method for making an improved and alternative self-locking structure for mounting a bearing ring or the like.

Another object is to meet the above object with a method that is relatively inexpensive, and which achieves a product that is positive in clamp action, inherently concentric in positioning and action, and resilient in suspension.

Other objects and various further features of novelty and invention will be pointed out or will occur to those skilled in the art from a reading of the following specification in conjunction with the accompanying drawings. In the drawings:

FIG. 1 is an isometric view of a tube or cylinder blank, representing a first step in carrying out the invention;

FIG. 2 is a similar view illustrating an intermediate formation step, a part of the view being broken away and shown in section in the radial plane 2—2;

2

FIG. 3 is a view in side elevation, illustrating use of the embodiment of a cylinder according to FIG. 2 as part of the inner-ring structure of an antifriction bearing, certain parts being shown in section in the plane 2—2 of FIG. 2;

FIG. 4 is a view similar to FIG. 3 to illustrate employment of another cylinder according to FIG. 2 as part of the outer-ring structure of an antifriction bearing;

FIG. 5 is an enlarged fragmentary sectional view taken along the line 5—5 of FIG. 4, certain portions being shown in phantom outline to indicate material removed in a processing step;

FIG. 6 is a view similar to FIG. 2, to illustrate a modified slotted cylinder of the invention;

FIG. 7 is another enlarged fragmentary sectional view, taken along the line 7—7 of FIG. 3, certain parts being shown in phantom outline to indicate material removed in a processing step;

FIG. 8 is an end-elevation view of the completed bearing of FIGS. 4 and 5;

FIG. 9 is a view similar to FIGS. 2 and 6, illustrating a further modification;

FIG. 10 is a plan view of the initial blank for a structure similar to that of FIG. 9;

FIG. 11 is a view similar to FIG. 10 to illustrate still another modification; and FIG. 12 is a view similar to FIG. 7 to illustrate a further modification.

In FIG. 1, a rigid metal tube or cylinder blank 10 is formed, having an internal bore 12 between its axial ends. The blank 10 may be roll-formed from flat stock or, as shown, may be cut from tubular stock; it will be used to form a self-locking ring for the mounting of a bearing, having inner and outer rings. In the case of mounting upon a shaft, the blank 10 is sized for radially spaced suspension within the bore of the inner-bearing ring, in which event the bore diameter of blank 10 is sized for interference-fit upon the shaft. In the case of mounting in the bore of a housing or the like, the blank 10 is sized for radially spaced suspension surrounding the outer-bearing ring, in which event the outer diameter of blank 10 is sized for interferenc- fit in the mounting bore.

The cylinder blank 10 is formed with plural angularly distributed elongated slots 14–16–18–20–22, defining a similar plurality of segments, as at 19–21–23. These slots are short of the respective ends of blank 10, so that circumferential continuity of axial ends (at 15–17) can be relied upon to maintain the spacing and orientation of the segments 19–21–23.

The slotted blank 10 may be sized to suit application requirements. In FIG. 3, such a blank 10' is shown embedded in elastomeric material 29 within the bore of the inner race ring 30 of an antifriction bearing which also includes an outer race ring 31 and interposed antifriction elements or balls 32. In FIG. 4, another such blank 10" similarly serves for the resilient mounting of the outer race ring 33 of an antifriction bearing which also includes an inner race ring 34 and interposed elements 35; the elastomeric material for resilient mounting is identified at 36.

In making the shaft-mounting embodiment of FIG. 3, a blank 10' is selected for bore diameter to slightly interfere with the shaft diameter, as for example to the extent of 0.005 to 0.025 inch, for the case of a ½-inch diameter shaft; blank 10' is also selected for axial length such that straight uniform portions of segments 19–21 etc. straddle the axial width of the inner race ring 30. Blank 10' is then positioned in an annular mold in which it is held concentrically and with end-for-end symmetry with respect to the inner-race ring 30; in other words, the positioning of blank 10 in ring 30 should be such as to project the ends 15–17 axially beyond the end faces of ring 30. Elastomeric material 29 is then introduced to fill the radial space between blank 10' and ring 30, as well as the spaces between segments 19–21 etc., and the parts are bonded when curing is complete. It is desirable, in certain applications, that elastomeric material shall not adhere to the shaft-gripping surfaces of segments 19–21. To assure this result, these shaft-gripping (radially inner) surfaces may be coated with a parting agent, prior to molding, to permit ready subsequent stripping of any molded elastomeric material which may have "flashed" over these surfaces; alternatively, or in addition, the mold cavity may include a central positioning stud with which blank 10' has a firm interference fit, thereby minimizing undesired flashing.

In making the bore-mounting embodiment of FIG. 4, a blank 10" is selected for external diameter to similarly interfere with that of the mounting bore. Molding, to fill spaces with elastomeric material 36, proceeds in an annular mold in which the outer diameter of blank 10" is preferably tight fitted to the bore of the mold, and in which the outer-race ring 33 is concentrically positioned within and in radially spaced relation with blank 10". In this embodiment precautions are taken to assure against forming or leaving elastomeric material on the clamping surfaces, namely, the radially outer surfaces of segments 19–21 etc.

After curing the annular mass of elastomeric material, the segments 19–21 etc. between the slots are severed, to define independent clamping feet, by removing material from the cylinder 10 (10'–10") at the axial ends thereof and beyond the end locations of the slots. FIGS. 7 and 5 respectively illustrate the material removed, for the cases of shaft-mounted and bore-mounted bearings (FIGS. 3 and 4).

In the shaft-mounted case (FIGS. 3 and 7), the inner-race ring 30 is shown fully bonded at its bore and at both end faces to the elastomeric material 29, and the ends 15'–17' of the blank 10' extend beyond the ultimate end radial planes 37–38 of the bearing, leaving the segment 19' to axially overlap the bore of the ring 30. The portions of blank 10' and mass 29 beyond these planes 37–38 are shown in phantom because they are removed as a processing step, as by face-turning and/or grinding, to establish the severed but uniformly positioned resiliently suspended independent clamping feet, as at 19'; for a neat final appearance, the grinding or other finishing step may remove a small axial excess of the inner ring 30, suggested at 39. Preferably, these steps occur before assembly of the ring 30 to the other bearing parts 31–32. Bevels or chamfers may then be formed at the mounting edges of the composite structure, as at 40, to facilitate interference-fitted application of the self-locking ring (FIG. 7) on the shaft for which it is designed.

In similar fashion, the excess material to be removed from the bore-mounted outer-race ring 33 is shown in phantom outline in FIG. 5, the limiting end planes being designated 41–42. The resulting structure is characterized by uniform clamping feet, uniformly spaced from each other and concentrically positioned with respect to the bearing axis. Finishing chamfers, as at 43, facilitate the interference-fit assembly to a mounting bore.

It will be understood that in FIGS. 3 and 4, the parts displayed in cross-section reflect the situation before the axial-end material is removed; when this finishing step has been completed, the cross-hatching no longer applies, as is apparent from a consideration of the end elevation view of FIG. 8.

In the alternative embodiment of FIG. 6, the cylinder or blank 50 is characterized by axial slots which are open at one axial end, to form segments 19–21–23 which are circumferentially connected at the other axial end 15. As already discussed, the diameter of the cylinder is selected depending upon the intended purpose, to produce a self-locking ring for mounting on a shaft or within a bore. The axially projecting cantilevered segments 19–21 etc. of FIG. 6 will be seen to simplify molding, in that the axial ends of these segments, together with the corresponding end face of the race ring to be bonded thereto, can be tightly fitted to the bottom of the mold, so as to provide a molded product which needs no special finishing or material removal at that end.

FIG. 9 illustrates a modification of the cylindrical blank of FIG. 6 wherein a radial flange 52 is the means of initially connecting and supporting the plural segments 53, spaced by slots 54. Such structure has the advantage of enhanced rigidity to maintain a cylindrical locus for the segments 53 until molding in the elastomeric material has been accomplished. The rigidity is still further enhanced if a similar flange (not shown) is provided at the other axial end. In either event, flanged structures as in FIG. 9 may be made from tubular ductile stock, cut to length, formed with radial flanges, as in a spinning operation, and then radially slotted to define the segments 53.

FIGS. 10 and 11 illustrate a further technique for forming a cylindrical blank generally similar to that of FIG. 9, by stamping from flat suitably ductile stock, such as sheet steel. In FIG. 10, the stamp pattern is circular, to define the radial flange 52', and plural spaced integral inward radius arms 53' are defined, for later bending into parallel relation, normal to the flange 52'; in the bending step, it will be understood that arms 53' may be suitably arcuately cusped or otherwise configurated depending upon the desired nature of their fit to a shaft or other mounting means. By thus cusping the individual arms 53', they may, when bent out of the plane of flange 52', all lie essentially in the same cylindrical locus as shown for arms 53 in FIG. 9.

Generally speaking, the radially outwardly extending type of flange 52 (or 52') is more suitable to shaft-mounted applications of the invention, wherein the blank or spaced segments is embedded in resilient material in the bore of an inner bearing ring or the like. For bore-mounted applications, a star-like shape is cut from flat stock, as shown in FIG. 11, wherein like angularly spaced arms extended radially outwardly from a central body or flange 56. As in FIG. 10, the arms 55 are arcuately cusped or otherwise configurated as desired and are bent into parallel relation, generally on a cylindrical locus of radius R. The radius R is such as to provide radial clearance with an outer bearing ring 33 or the like, so that the resilient suspension of FIGS. 4 and 5 can be achieved.

In FIG. 12, we illustrate that the invention is applicable to further enhancement of locking action, as to the mounting of bearing 60 on a shaft 61. The cylindrical blank with segments 62–63 may be of the flanged type illustrated by FIG. 9, except that the radial flange connecting these segments is eccentrically contoured with respect to the cylindrical axis. In the section of FIG. 12, low and high points 64–65 of the eccentric flange contour show above and below the axis, and a conical relief 66 characterizes this eccentric contour. The slots between adjacent segments will be understood to extend substantially to the plane of the eccentric radial flange, and one or more of these slots, preferably angularly located to avoid the high point of the eccentric contour, may be cut all the way through the flange, thus allowing the flanged region to spread when the resiliently suspended cylindrical blank is pressed onto the shaft 61. A locking collar 67 is shown with a concave eccentric counterbore 68, and with a bore 69 for initial loose assembly to the shaft 61. Locking is achieved by partial rotation of collar 67 with respect to the eccentric flange, with the eccentric surfaces in radial registry. FIG. 12 shows the locking relationship when high eccentric contours bind at 70 against bore reaction to the shaft at 71, thus camming the flange part 65 firmly to the shaft. Since this collar locking function is offset from segments 62–63, there is relatively little degradation of the noise-and vibration-absorbing mounting achieved through the bonded elastomeric material 72.

It will be seen that we have described an economical method for manufacturing self-locking rings. The advantage of the approach suggested herein resides in the employment of tubular material which is finished in the diametral dimensions desired for final mounting onto a shaft or within a bore; also, the gripping surface of each clamping foot may be preformed with knurls, ridges or the like for more extensive biting engagement with the bore or shaft to which it is installed, in that material-removal to achieve foot separation does not affect any clamping surfaces.

We claim:

1. The method of making a self-locking ring for mounting to a shaft or in a bore, comprising forming a stiff tubular member with its wall characterized by angularly spaced axially extending segments interconnected at one axial end of the tubular member, a fitting diameter of the tubular member being formed to fit with interference with respect to the shaft or the bore, selecting a rigid ring body having a diameter to fit with radial clearance concentrically with said tubular member, filling with an elastomeric material the annular and angular spaces between the concenrtically mounted ring body and the tubular member and between said segments, and removing material from said one end of the tubular member to sever the connection of said segments and thereby isolate said segments to define independent clamping feet resiliently supported by the elastomeric material.

2. The method of claim 1 wherein said tubular-members forming step includes forming a circular flat apertured plate with angularly spaced radially inwardly extending arms, bending the arms substantially parallel to each other and transverse to the plane containing the flat plate, and forming the arms in an arcuate shape conforming to the fitting diameter of said tubular member.

3. The method as recited in claim 1 wherein said tubular-member forming step includes forming a flat plate having a circular central portion with a plurality of angularly spaced radially outwardly extending arms, bending the arms substantially parallel to each other and transverse to the plane containing the flat plate, and forming the arms in an arcuate shape conforming to the fitting diameter of said tubular member.

4. The method as recited in claim 1 wherein said tubular-member forming step further comprises forming a cylinder blank having a bore extending between the ends of the cylinder, and stamping a plurality of angularly spaced slots having an axial length less than the axial length of the cylinder, and wherein said material-removing step comprises removing material from both axial ends of the cylinder to isolate and define said feet.

5. The method of making a self-locking ring for attachment to a shaft, which comprises forming a stiff tubular member with its wall characterized by angularly spaced axially extending segments interconnected at one axial end, said tubular member further having a bore of a diameter which interferes with the shaft diameter, selecting a rigid ring body having an internal diameter to fit with radial clearance about the tubular member and concentrically positioning the same with respect to the tubular member, filling the annular and angular spaces between the concentrically mounted ring body and the tubular member and between said segments with an elastomeric material, and removing material from said one end of said tubular member to isolate and disconnect said segments and thereby establish independent clamping feet resiliently supported by the elastomeric material.

6. The method as recited in claim 5, wherein the tubular member forming step comprises forming a rigid tubular member having said segments angularly separated from one another by slots terminating short of an interconnecting circumferentially extending end, and removing material at said circumferentially extending end to an axial extent which severs said segments from each other.

7. The method of making a self-locking ring for attachment within a bore which comprises forming a stiff tubular member with its wall characterized by angularly spaced axially extending segments interconnected at one axial end of the tubular member, said tubular member having an outer surface of a diameter which interferes with the bore diameter, selecting a rigid ring body having an outer diameter to fit with radial clearance in the bore of the tubular member, filling with an elastomeric material the annular space formed between the concentrically mounted ring body and the tubular member and between said segments, removing material from said one end of said tubular member to sever said segments and thereby form isolated clamping feet resiliently supported by the elastomeric material.

8. The method as recited in claim 7, wherein said tubular-member forming step comprises forming a rigid tubular member having said segments angularly separated from one another by slots terminating short of an interconnecting circumferentially extending end, and removing material at said circumferentially extending end, to an axial extent which severs said segments from each other.

9. The method of making a self-locking ring for mounting to a shaft or in a bore, which comprises forming a tubular member with its wall characterized by angularly spaced axially extending segments interconnected at at least one axial end, a fitting diameter of the tubular member being formed to fit with interference with respect to the shaft or the bore, selecting a rigid ring body having a diameter to fit with radial clearance concentrically with said tubular member, said ring body having an axial length less than the axial extent of said segments, positioning said ring body concentrically with respect to and in full axial overlap with the segmented portions of said tubular member, filling with an elastomeric material the annular and angular spaces between said ring body and tubular member and between said segments, whereby said tubular member projects at least beyond one axial end of said ring body, and exposing said projecting end of said tubular member for independent direct clamping to the shaft or bore.

References Cited

UNITED STATES PATENTS

| 2,928,701 | 3/1960 | Ferdig | 308—190 |
| 3,177,559 | 4/1965 | Boschi et al. | |
| 3,224,242 | 12/1965 | Noll. | |

THOMAS H. EAGER, Primary Examiner

U.S. Cl. X.R.

29—527.6; 308—236